United States Patent
Shao

(10) Patent No.: US 7,072,836 B2
(45) Date of Patent: Jul. 4, 2006

(54) SPEECH PROCESSING APPARATUS AND METHOD EMPLOYING MATCHING AND CONFIDENCE SCORES

(75) Inventor: Yuan Shao, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 904 days.

(21) Appl. No.: 09/898,776

(22) Filed: Jul. 3, 2001

(65) Prior Publication Data

US 2002/0049593 A1   Apr. 25, 2002

(30) Foreign Application Priority Data

Jul. 12, 2000   (GB)   .................. 0017157.9

(51) Int. Cl.
*G10L 15/28* (2006.01)

(52) U.S. Cl. .................. 704/255; 704/251; 704/252

(58) Field of Classification Search ........... 704/251, 704/255, 252, 254
See application file for complete search history.

(56) References Cited

U.S. PATENT DOCUMENTS

| | | | | |
|---|---|---|---|---|
| 4,783,803 A * | 11/1988 | Baker et al. | ................ | 704/252 |
| 5,202,952 A * | 4/1993 | Gillick et al. | ................ | 704/200 |
| 5,440,662 A * | 8/1995 | Sukkar | ................ | 704/236 |
| 5,465,317 A * | 11/1995 | Epstein | ................ | 704/236 |
| 5,526,463 A * | 6/1996 | Gillick et al. | ................ | 704/251 |
| 5,559,925 A | 9/1996 | Austin | ................ | 395/2.4 |
| 5,613,037 A | 3/1997 | Sukkar | ................ | 395/2.65 |
| 5,710,864 A | 1/1998 | Juang et al. | ................ | 395/2.47 |
| 5,710,866 A * | 1/1998 | Alleva et al. | ................ | 704/256 |
| 5,737,489 A | 4/1998 | Chou et al. | ................ | 395/2.65 |
| 5,832,430 A * | 11/1998 | Lleida et al. | ................ | 704/256 |
| 5,842,163 A | 11/1998 | Weintraub | ................ | 704/240 |
| 6,195,634 B1 * | 2/2001 | Dudemaine et al. | ........ | 704/231 |
| 6,535,850 B1 * | 3/2003 | Bayya | ................ | 704/239 |
| 6,539,353 B1 * | 3/2003 | Jiang et al. | ................ | 704/254 |

FOREIGN PATENT DOCUMENTS

| | | |
|---|---|---|
| EP | 0 335 739 | 10/1989 |
| EP | 0 533 338 | 3/1993 |
| EP | 0 789 349 A2 | 8/1997 |

OTHER PUBLICATIONS

"Correcting Recognition Errors Via Discriminative Utterance Verification", Setlur, et al., Lucent Technologies, Naperville, IL, pp. 602-605.
"A Probablistic Approach To Confidence Estimation and Evaluation", Gillick, et al., Dragon Systems, Inc., Newton, MA.

(Continued)

*Primary Examiner*—W. R. Young
*Assistant Examiner*—Michael N. Opsasnick
(74) *Attorney, Agent, or Firm*—Fitzpatrick Cella Harper & Scinto

(57) ABSTRACT

A speech recognition method and apparatus is disclosed in which each utterance matched to a feature model within a feature model memory (110) is associated with a confidence score indicative of the posterior probability of the word being correctly matched, given that the matching of the utterance to the feature model generated certain values indicative of the goodness of the match. The confidence score for the matching of an utterance to a feature model is determined from the generated values indicative of the goodness of the match and a stored set of parameters indicating the probability of the generated values arising given that a match is either correct or incorrect.

34 Claims, 9 Drawing Sheets

OTHER PUBLICATIONS

"Neural—Network Based Measures of Confidence For Word Recognition", Weintraub, et al., Speech Technology and Research Laboratory, IEEE, 1997, pp. 887-890.

"Detecting Misrecognition and Out-of-Vocabulary Words", IEEE 1994 Young, School of Computer Science, Carneigie Mellon University, pp. 21-24.

Estimating Confidence Using Word Lattices, Kemp, et al., ESCA, Eurospeech 97, Interactive Systems Laboratories, University of Karlsruhe, Germany, pp 827-830.

"Using Word Probabilities As Confidence Measures", Wessel, et al., Lehrstuhl fur Informatik VI, RWTH Aachen—University of Technology, Germany, pp. 225-228.

* cited by examiner

SPEECH PROCESSING APPARATUS AND METHOD EMPLOYING MATCHING AND CONFIDENCE SCORES

The present invention relates to a speech processing apparatus and method. In particular, embodiments of the present invention are applicable to speech recognition.

Speech recognition is a process by which an unknown speech utterance is identified. There are several different types of speech recognition systems currently available which can be categorised in several ways. For example, some systems are speaker dependent, whereas others are speaker independent. Some systems operate for a large vocabulary of words (>10,000 words) while others only operate with a limited sized vocabulary (<1000 words). Some systems can only recognise isolated words whereas others can recognise phrases comprising a series of connected words.

In a limited vocabulary system, speech recognition is performed by comparing features of an unknown utterance with features of known words which are stored in a database. The features of the known words are determined during a training session in which one or more samples of the known words are used to generate reference patterns therefor. The reference patterns may be acoustic templates of the modelled speech or statistical models, such as Hidden Markov Models.

To recognise the unknown utterance, the speech recognition apparatus extracts a pattern (or features) from the utterance and compares it against each reference pattern stored in the database. A scoring technique is used to provide a measure of how well each reference pattern, or each combination of reference patterns, matches the pattern extracted from the input utterance. The unknown utterance is then recognised as the word(s) associated with the reference pattern(s) which most closely match the unknown utterance.

In limited vocabulary speech recognition systems, any detected utterance is usually matched to the closest corresponding word model within the system. A problem with such systems arises because out-of-vocabulary words and environmental noise can be accidentally matched to a word within the system's vocabulary.

One method of detecting accidental matches used by prior art systems is to provide a language model which enables the likelihood that detected words would follow each other to be determined. Where words are detected that are unlikely to follow each other, the language model can then identify that at least one of the detected words will probably have been incorrectly identified.

An alternative method of detecting accidental recognition is to generate a measure of how well a detected utterance matches the closest word model as is disclosed in for example U.S. Pat. Nos. 5,559,925, 5,613,037, 5,710,864, 5,737,489 and 5,842,163. This measure or confidence score is then used to help the system recognise accidental matches. However, the correlation between generated confidence scores in the prior art and the likelihood that an utterance has been mismatched can be unsatisfactory.

There is therefore a need for apparatus and method which can generate a better measure of the likelihood that an utterance has been mismatched. Furthermore, there is a need for a speech recognition system in which a generated score that the likelihood that an utterance has been mismatched can be combined with other means of detecting mismatched utterances such as that provided by language models so that the reliability of speech recognition systems can be improved.

In accordance with one aspect of the present invention there is provided a speech recognition apparatus for matching detected utterances to words comprising:
  detection means for detecting and determining a plurality of features of a detected utterance to be matched; and
  matching means for determining which of a plurality of stored models most closely matches said features of a detected utterance, said matching means being arranged to output at least one value on the basis of the correspondence of the features of the utterance and features of stored models;
characterised by:
  conversion means for outputting as a confidence score data indicative of the probability the utterance has been correctly matched utilising the at least one value output by said matching means.

The applicants have appreciated that the limitations of using prior art confidence scores arise because the confidence scores do not provide a true measure of the likelihood that an utterance has been correctly matched. In particular, in order to be a better measure of likelihood of correct matching, any generated values should closely approximate values indicative of the posterior probability that a recognition is correct given an observation. One advantage of such calculated values is that the value can then be utilised by other models such as a language model to modify a calculation that a recognition is correct when such additional information is available.

An exemplary embodiment of the invention will now be described with reference to the accompanying drawings in which.

Embodiments of the present invention can be implemented in computer hardware, but the embodiment to be described is implemented in software which is run in conjunction with processing hardware such as a personal computer, workstation, photocopier, facsimile machine or the like.

Figure 1:
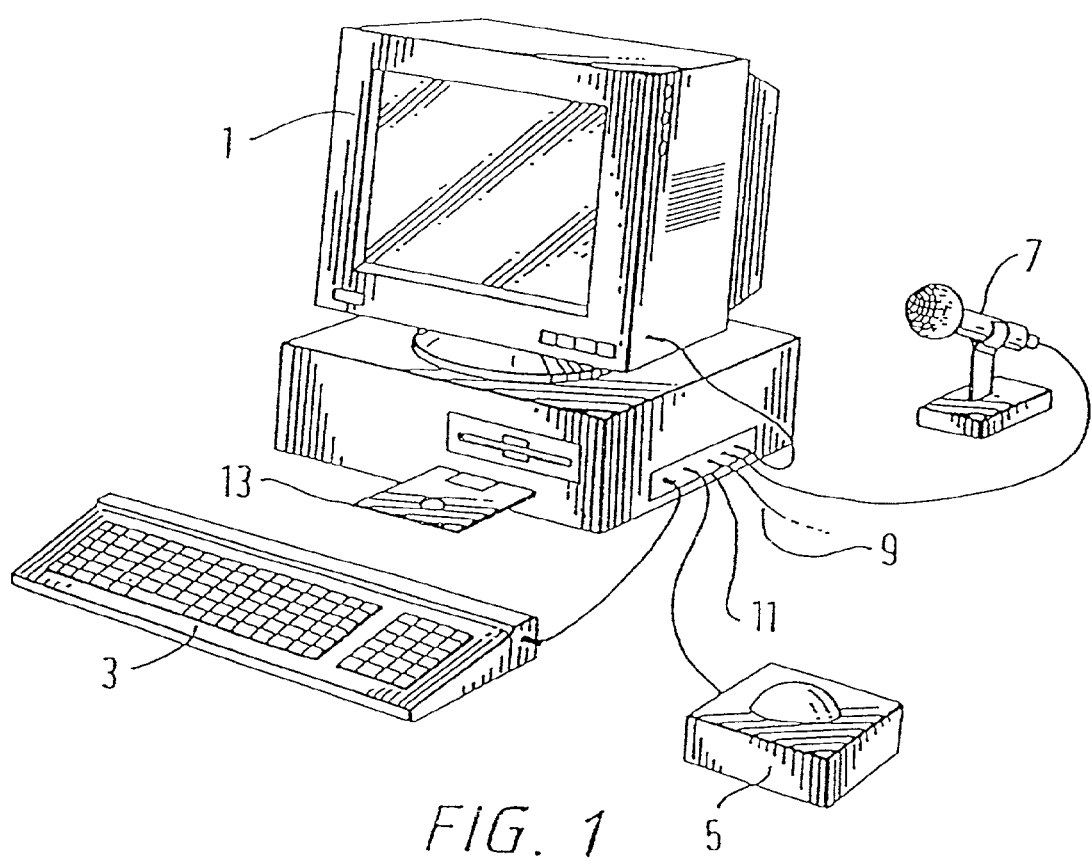
FIG. 1 is a schematic view of a computer which may be programmed to operate an embodiment of the present invention.

FIG. 1 shows a personal computer (PC) 1 which may be programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the PC 1 can communicate with, for example, a remote computer or with a remote user.

The programme instructions which make the PC 1 operate in accordance with the present invention may be supplied for use with an existing PC 1 on, for example a storage device such as a magnetic disc 13, or by downloading the software from the Internet (not shown) via the internal modem and the telephone line 9.

Figure 2:
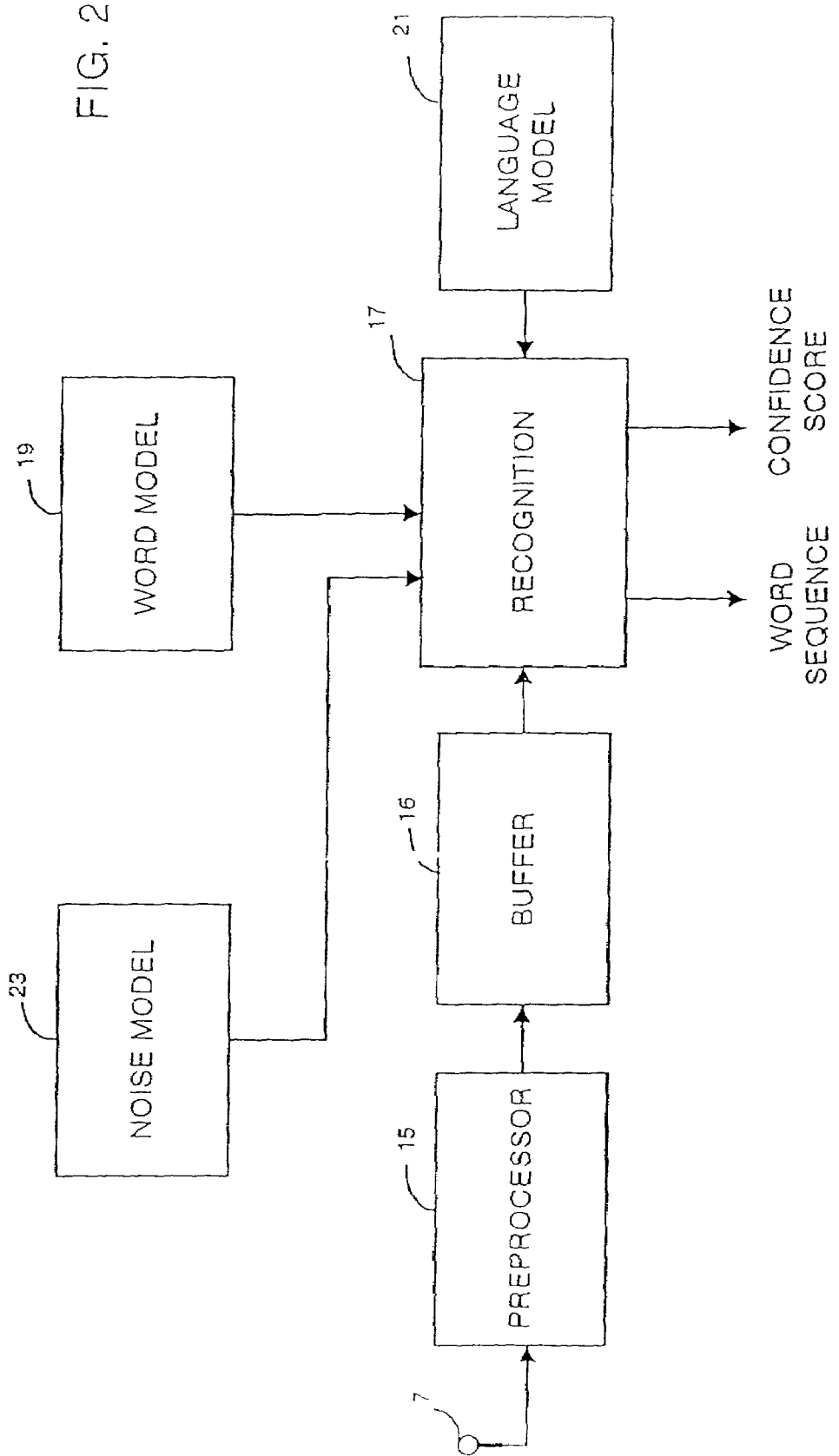
FIG. 2 is a schematic overview of a speech recognition system.

The operation of the speech recognition system of this embodiment will now be briefly described with reference to FIG. 2. A more detailed description of the speech recognition system can be found in the Applicant's earlier European patent application EP 0789349, the content of which is hereby incorporated by reference. Electrical signals representative of the input speech from, for example, the microphone 7 are applied to a preprocessor 15 which converts the input speech signal into a sequence of parameter frames, each representing a corresponding time frame of the input speech signal. The sequence of parameter frames are supplied, via buffer 16, to a recognition block 17 where the speech is recognised by comparing the input sequence of parameter frames with reference models or word models stored in a word model block 19, each model comprising a sequence of parameter frames expressed in the same kind of parameters as those of the input speech to be recognised.

A language model 21 and a noise model 23 are also provided as inputs to the recognition block 17 to aid in the recognition process. The noise model is representative of silence or background noise and, in this embodiment, comprises a single parameter frame of the same type as those of the input speech signal to be recognised. The language model 21 is used to constrain the allowed sequence of words output from the recognition block 17 so as to conform with sequences of words known to the system.

The word sequence output from the recognition block 17 may then be transcribed for use in, for example, a personal digital assistant program running on the PC 1. The transcribed word sequence could be used to, for example, initiate, stop or modify the action of the personal digital assistant program running on the PC 1. Thus in the case of a personal digital assistant program including a calendar program, an address book program and an e-mail program, a transcribed word sequence could be utilized to select which of the programs was to be activated. Alternatively, where word templates were stored associated with data records in the address book, voice commands might be used to retrieve specific records from the address book or utilize an address in the address book to dispatch an e-mail.

In accordance with the present invention, as part of the processing of the recognition block 17 the words of the output word sequence are each associated with a confidence score indicative of the likelihood of recognised words having been correctly recognised. In this embodiment, this confidence score is then utilised by the PC 1 to determine whether the matching of received speech input to words is sufficiently accurate to either act on the received input, to ask for user confirmation of the data, to ignore the received input or to request re-entry of the data.

A more detailed explanation will now be given of some of the apparatus blocks described above.

Preprocessor

The preprocessor will now be described with reference to FIG. 3.

The functions of the preprocessor 15 are to extract the information required from the speech and to reduce the amount of data that has to be processed. There are many different types of information which can be extracted from the input signal. In this embodiment the preprocessor 15 is designed to extract "formant" related information. Formants are defined as being the resonant frequencies of the vocal tract of the user, which change as the shape of the vocal tract changes.

Figure 3:
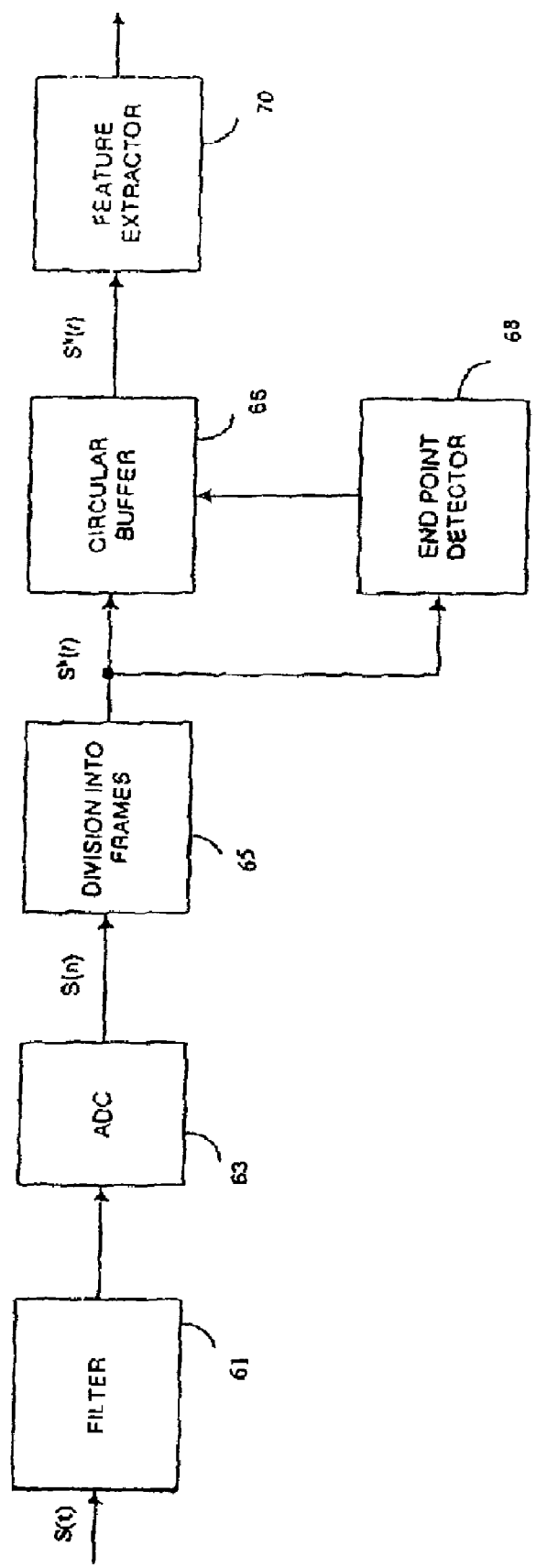
FIG. 3 is a block diagram of the preprocessor incorporated as part of the system shown in FIG. 2, which illustrates some of the processing steps that are performed on the input speech signal.

FIG. 3 shows a block diagram of some of the preprocessing that is performed on the input speech signal. Input speech S(t) from the microphone 7 or the telephone line 9 is supplied to filter block 61, which removes frequencies within the input speech signal that contain little meaningful information. Most of the information useful for speech recognition is contained in the frequency band between 300 Hz and 4 KHz. Therefore, filter block 61 removes all frequencies outside this frequency band. Since no information which is useful for speech recognition is filtered out by the filter block 61, there is no loss of recognition performance. Further, in some environments, for example in a motor vehicle, most of the background noise is below 300 Hz and the filter block 61 can result in an effective increase in signal-to-noise ratio of approximately 10 dB or more. The filtered speech signal is then converted into 16 bit digital samples by the analogue-to-digital converter (ADC) 63. To adhere to the Nyquist sampling criterion, the ADC 63 samples the filtered signal at a rate of 8000 times per second. In this embodiment, the whole input speech utterance is converted into digital samples and stored in a buffer (not shown), prior to the subsequent steps in the processing of the speech signals.

After the input speech has been sampled it is divided into non-overlapping equal length frames in block 65. The speech frames $S^k(r)$ output by the block 65 are then written into a circular buffer 66 which can store 62 frames corresponding to approximately one second of speech. The frames written in the circular buffer 66 are also passed to an endpoint detector 68 which process the frames to identify when the speech in the input signal begins, and after it has begun, when it ends. Until speech is detected within the input signal, the frames in the circular buffer are not fed to the computationally intensive feature extractor 70. However, when the endpoint detector 68 detects the beginning of speech within the input signal, it signals the circular buffer to start passing the frames received after the start of speech point to the feature extractor 70 which then extracts a set of parameters $f_k$ for each frame representative of the speech signal within the frame. The parameters $f_k$ are then stored in the buffer 16 (not shown in FIG. 3) prior to processing by the recognition block 17 (as will now be described).

Recognition Block and Word Model Block

Figure 4:
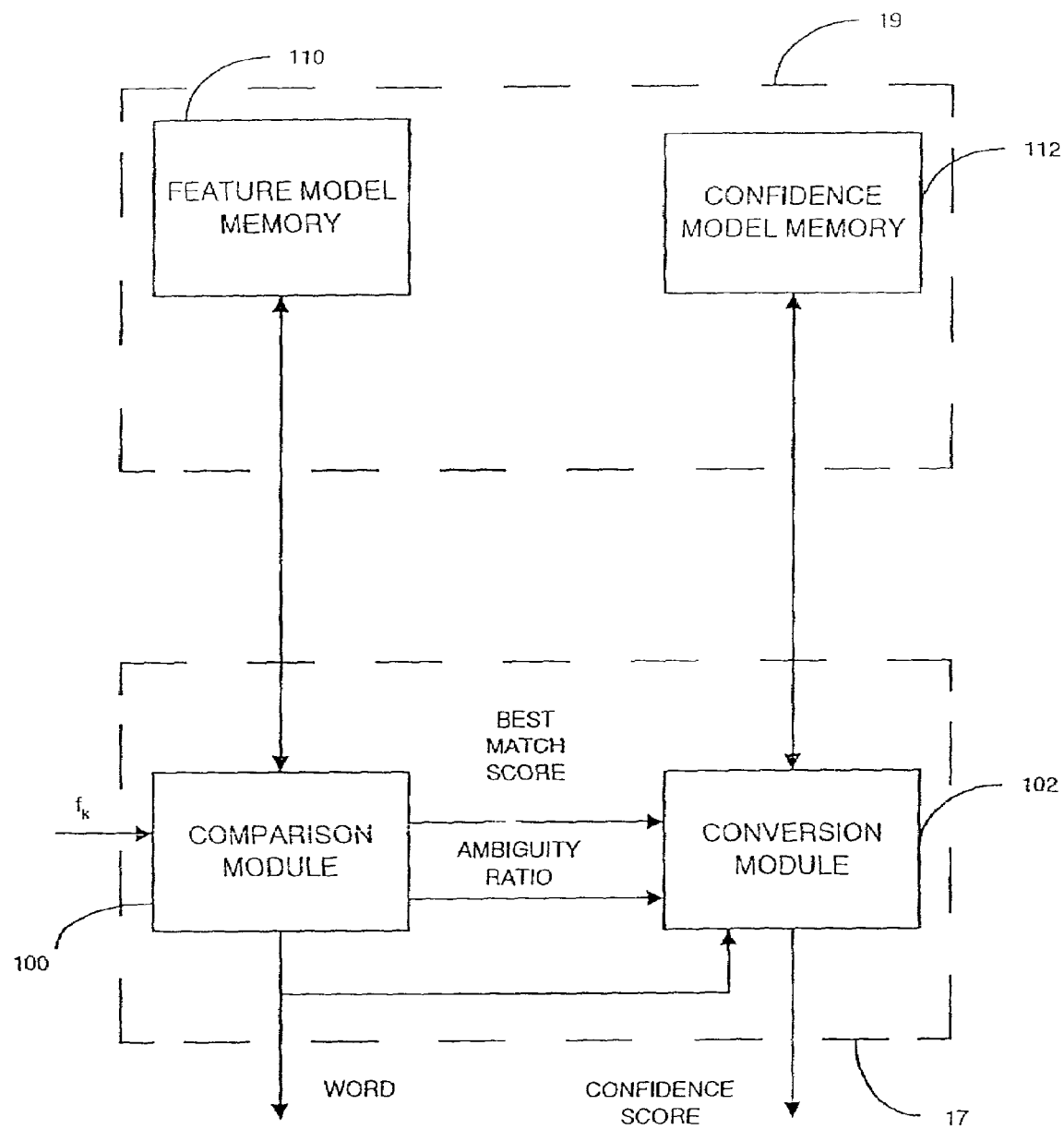
FIG. 4 is a block diagram of the word model block and recognition block incorporated as part of the system shown in FIG. 2.

FIG. 4 is a schematic block diagram of a recognition block 17 and word model block 19 in accordance with the present invention.

In this embodiment, the recognition block 17 comprises a comparison module 100 arranged to receive sets of parameters $f_k$ from the buffer 16 (not shown in FIG. 4). The comparison module 100 is itself connected to a conversion module 102.

In this embodiment of the present invention the word model block 19, comprises a feature model memory 110 storing models of words comprising parameter frames expressed in the same kind of parameters as those received by the comparison module 100 and a confidence model memory 112 storing parameters of probability functions indicative of the likelihood of words being correctly or incorrectly recognised as will be described in detail later. In this embodiment each of the feature models in the feature model memory 110 is representative of a different word. The feature model memory 110 is connected to the comparison module 100 of the recognition block 17 and the confidence model memory 112 is connected to the conversion module 102 of the recognition block 17.

In use, when the comparison module 100 receives a sequence of parameter frames $f_k$ from the buffer 16 (not shown in FIG. 4) the comparison module 100 processes the parameter frames $f_k$ together with data stored in the feature model memory 110 in a conventional manner to determine which word model stored within the feature model memory 110 corresponds most closely to the received sequence of parameter frames. Data indicative of the most closely matching word is then output by the recognition block 17.

Additionally, in this embodiment, the comparison module 100 passes data indicative of the most closely matching word to the conversion module 102 together with a best match score comprising a value indicative of how closely the received sequence of frames $f_k$ matches the selected output word and an ambiguity ratio being a ratio of the score for the best match between a received sequence of parameter frames $f_k$ and a model within the feature model memory 110 and a score for the second best match between the received sequence of parameter frames $f_k$ and a different model within the feature model memory 110.

The conversion module 102 then utilises the received data indicative of a matched word to select, from the confidence model memory 112, a set of probability functions for that word. The conversion module 102 then utilises the selected probability functions retrieved from the confidence model memory 112, together with the best match score and ambiguity ratio received from the comparison module 100 to determine a value indicative of the likelihood that the word matched to the received sequence of parameter frames $f_k$ has been correctly matched given that the received sequence of parameter frames $f_k$ resulted in the generation of the received best match score and ambiguity ratio. This confidence score is then output by the recognition block 17.

The applicants have appreciated that in order for a speech recognition system to be able to reject as many incorrect utterances as possible whilst not querying correctly matched utterances a confidence score representative of a calculated posterior probability of whether a word is correctly matched given an utterance provides a better means of filtering the output of a speech processing apparatus than utilising values directly generated by a matching module. Furthermore, the applicants have appreciated that such a confidence score may be determined from values generated from a matching module as it is possible to determine in advance probability functions for the probability that the correct or incorrect matching of a word would result in the generation of defined measured determinations of the quality of a match.

Since a confidence score representative of a calculated posterior probability of a correct match occurring given that a certain measured value arises from the match may be considered to be independent of other determined probabilities that a match is correct, by calculating such a score a means is provided by which confidence scores generated from different measures of the goodness of a match can be combined. Furthermore, where a confidence score is representative of a posterior probability of a match being correct given an utterance, such a value is suitable for modification on the basis of other available information such as that available from language models.

Figure 5:
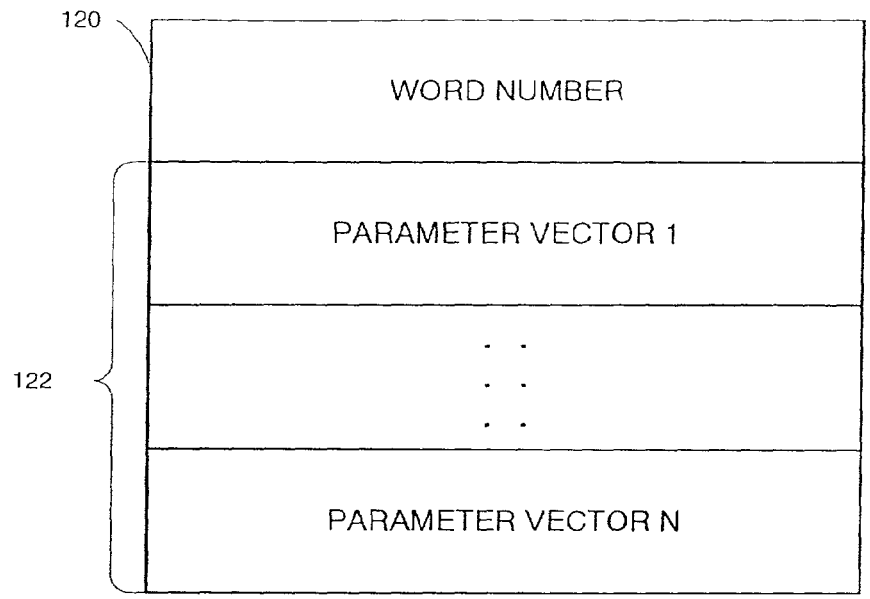
FIG. 5 is a schematic block diagram of an exemplary data structure for a feature model for a word.

Prior to describing in detail the processing of the recognition block 17 in accordance with this embodiment of the present invention, exemplary data structures for feature models and confidence models stored within the feature model memory 110 and confidence model memory 112 will now be described with reference to FIGS. 5 and 6.

In this embodiment of the present invention, the feature model memory 110 has stored therein a plurality of feature models for different words with each word being represented by a single word model. FIG. 5 is a schematic block diagram of an exemplary data structure for a feature model for a word. In this embodiment each feature model comprises a word number 120 and a plurality of parameter vectors 122. The parameter vectors 122 each comprise a set of values to be matched corresponding values from with a similar vector for a parameter frame from a sequence of parameter frames $f_k$, generated by the feature extractor 70 of the pre-processor 15. Thus, for example, a parameter vector might comprise a set of cepstral coefficients which can be matched to cepstral coefficients for a detected utterance generated by the pre-processor 15.

Figure 6:
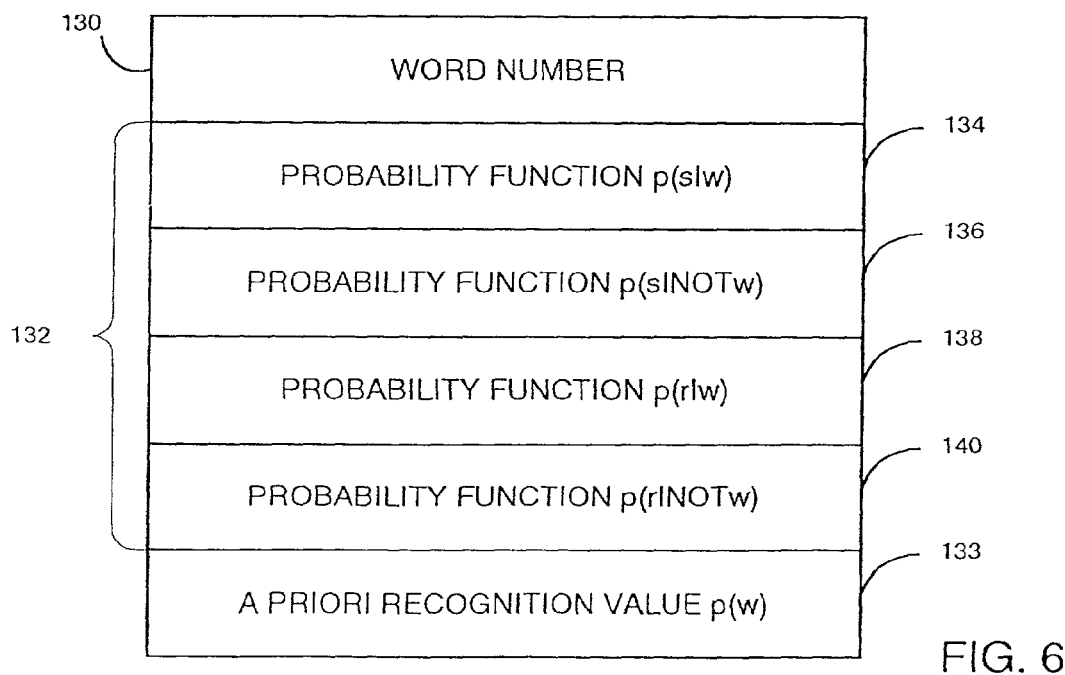
FIG. 6 is a schematic block diagram of an exemplary data structure for a confidence model for a word.

FIG. 6 is a schematic block diagram of a confidence model for a word stored within the confidence model memory 112. In this embodiment the confidence models each comprise a word number 130 corresponding to a word number 120 of a feature model stored in the feature model memory 110, a set of four probability function parameters 132 and an a priori recognition value 133.

In this embodiment the set of four probability function parameters comprise parameters defining a probability density function p(s|w) 134 for a generated best match score given that a recognised word is correctly recognised, a set of parameters defining a probability density function p(s|NOTw) 136 for generated best match score values given that a recognised word is incorrectly matched, a set of parameters defining a probability density function p(r|w) 138 for values of an ambiguity ratio given that a matched word is correctly matched, and a set of parameters defining a probability density function p(r|NOTw) 140 for a probability density of the value of an ambiguity ratio given that a matched word is incorrectly matched. The a priori recognition value 133 is a value p(w) that is representative of a predetermined a priori probability that a word model results in a correct match to an utterance.

In this embodiment each of the probability density function parameters for probability density functions p(s|w), p(s|NOTw), p(r|w) and p(r|NOTw) 134–140 are stored in terms of a function type and one or more coefficients from which the probability density functions can be generated. Thus for example for a particular word the following parameters might be stored defining the probability density functions for a confidence model for the word:

| | | | |
|---|---|---|---|
| p(s\|w) | Function type | = | Shifted Maxwell |
| | μ | = | 3968.8 |
| | σ | = | 2538.4 |
| p(s\|NOTw) | Function type | = | Mirror Gausian |
| | mean | = | 10455.1 |
| | deviation | = | 1796.2 |
| p(r\|w) | Function type | = | Maxwell |
| | σ | = | 0.1200 |
| p(r\|NOTw) | Function type | = | Mirror Gausian |
| | mean | = | 1 |
| | deviation | = | 0.0313 |

Thus, in this way, data 132 defining a plurality of functions are stored in relation to a word number 130, together with an a priori recognition value 133 which enables best match score values and ambiguity ratios to be utilised to generate a confidence score indicative of the posterior probability that a recognition result is correct as will be described in detail later.

Processing of the Recognition Block

Figure 7:
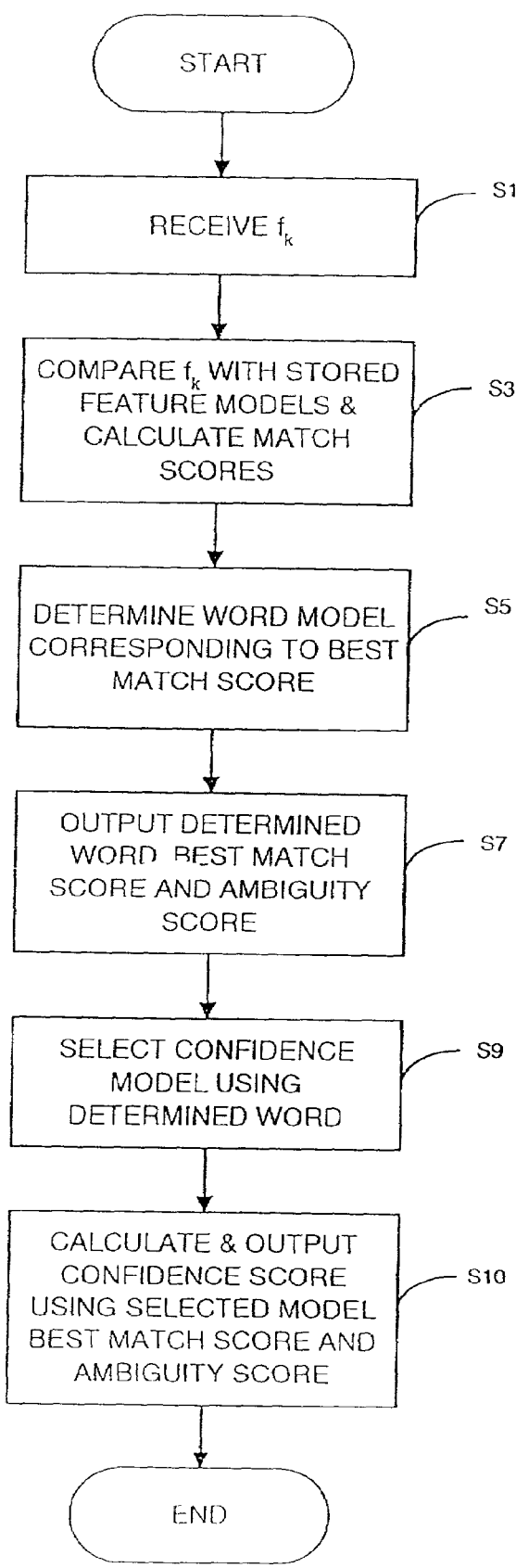
FIG. 7 is a flow diagram of the processing of the recognition block in matching an utterance with a feature model and generating a confidence score indicative of the posterior probability of the matching of an utterance being correct given the observation.

The processing of the recognition block 17 matching an utterance with a feature model and generating a confidence score indicative of the posterior probability of the matching of the utterance being correct given an observation will now be described with reference to FIG. 7 which is a flow diagram of the processing of the recognition block 17.

Initially (S1) the comparison module 100 receives a set of parameter frames $f_k$ from the buffer 16. When a set of parameter frames $f_k$ have been received by the comparison module 100, the comparison module 100 then (S3) compares the received parameter frames with the parameter vectors 122 of the word models stored in the feature model memory 110. For each of the word models, the comparison module 100 then calculates a match score for the word model by determining the sum of absolute differences between the values of the parameter vectors 122 of the word model and corresponding values of the received parameter frames $f_k$ received from the buffer 16 in a conventional manner. These calculated match scores are then stored within the comparison module 100 together with the word number 120, for the word models used to determine the match scores.

After the comparison module 100 has calculated and stored match scores for each of the word models stored within the feature model memory 110, the comparison module 100 then (S5) determines which of the word models is associated with the lowest and second lowest match score, and therefore which word models most closely match the sequence of parameter vectors $f_k$ received from the buffer 16.

After the best and second best matches for the received sequence of parameter vectors $f_k$ have been determined, the comparison module 100 then (S7) outputs as a match for the utterance the word number 120 associated with the word model record within the feature model memory 110 which resulted in the lowest generated match score. The comparison module 100 also passes this word number 120 together with the value for the best match score (ie. the lowest match score) and an ambiguity ratio being a calculated value for the ratio of the lowest match score to the second lowest match score to the conversion module 102.

When the conversion module 102 receives the word number 120, the best match score and the ambiguity ratio, the conversion module 102 then (S9) selects from the confidence model memory 112 the record having a word number 130 corresponding to the word number 120 received from the comparison module 100. The probability function parameters 132 and word recognition values 133 from the retrieved confidence model record are then (S10) utilised by the conversion module 102 to calculate a confidence score as will now be explained.

In accordance with this embodiment of the present invention an output confidence score is a value indicative of the posterior probability of a recognition result being correct given the generated best match scores and ambiguity ratio for that match. Where s is the best match score and r is the ambiguity ratio and w the word recognised, a confidence score equal to the posterior probability of the recognition result can be formulated using Bayes rule as being equal to $$p(w|s,r) = \frac{p(s,r|w) \cdot p(w)}{p(s,r)} \quad (1)$$

where p(s,r|w) is the likelihood of a value s for the best score and r for an ambiguity ratio would arise given that w is the word recognised, p(w) is the a priori prior probability of the word w being correctly matched, and p(s,r) is the prior probability of a match score s and an ambiguity ratio r arising from the matching of an utterance.

Assuming s and r are mutually independent, which although is an artificial and unrealistic assumption can be justified if the resulting estimate of confidence appears reliable, then the posterior probability of the recognition being correct above may be reformulated as $$p(w|s,r) = \frac{p(s|w) \cdot p(r|w) \cdot p(w)}{p(s,r)} \quad (2)$$

Similarly the posterior probability of the recognition result being incorrect is $$p(NOTw|s,r) = \frac{p(s|NOTw) \cdot p(r|NOTw) \cdot p(NOTw)}{p(s,r)} \quad (3)$$

Since $$p(w|s,r) + p(NOTw|s,r) = 1 \quad (4)$$

combining these two equations, the probability of a word w being correctly matched given the matching process has generated a match score s and an ambiguity ratio r, can therefore be formulated as:

$$p(w|s,r) = \frac{p(s|w) \cdot p(r|w) \cdot p(w)}{p(s|w) \cdot p(r|w) \cdot p(w) + p(s|NOTw) \cdot p(r|NOTw) \cdot p(NOTw)} \quad (5)$$

Further since:

$$p(NOTw) = 1 - p(w) \quad (6)$$

Equation 5 may be reformulated as $$p(w|s,r) = \frac{p(s|w) \cdot p(r|w) \cdot p(w)}{p(s|w) \cdot p(r|w) \cdot p(w) + p(s|NOTw) \cdot p(r|NOTw)[1-p(w)]} \quad (7)$$

Therefore by storing in the confidence model memory 112 for each word, a set of probability function parameters 132 defining for a word the probability functions p(s|w), p(s|NOTw), p(r|w) and p(r|NOTw) and a value 133 for the a priori prior probability for the correct recognition of a word p(w), a value for the posterior probability of the recognition of a word being correct given that an utterance resulted in the determination of particular values for a best match score and ambiguity ratio may be calculated.

Thus in accordance with this embodiment after the conversion module 102 retrieves a confidence model record from the confidence model memory 112, the conversion module then (s10) utilises the retrieved probability function parameters 132 retrieved from the confidence model memory 112 together with the best match score and ambiguity ratio to determine calculated values for p(s|w), p(r|w), p(s|NOTw) and p(r|NOTw) for the received best match score and ambiguity ratio. A value for p(w|s,r) is then calculated by the conversion module 102 from equation (7) above utilizing these calculated probabilities and the retrieved value 133 for the a priori prior word probability p(w) from the confidence model retrieved from the confidence model memory 112. This calculated value is then output by the conversion module 102 as a confidence score for the matching of an utterance to the output word.

The confidence score can then be used by the PC 1 to evaluate whether the likelihood that the word is correctly matched is sufficiently high so that it should be acted upon, whether the input data should be queried, whether repeated input of data should be requested, or whether the detected input should be ignored.

Generation of Confidence Models

Thus as has been described above by associating a confidence model with each word model in the word model memory 110 a means is provided by which the conversion module 102 can convert the best match score and ambiguity ratio generated by the matching module 100 into a confidence score indicative of the posterior probability that a matched word has been correctly matched given that the matching resulted in the generation of such a best match score and ambiguity ratio.

A method of generating the parameters stored as confidence models for the feature models in the feature model memory 110 will now be described with reference to FIGS. 8 to 12.

Figure 8:
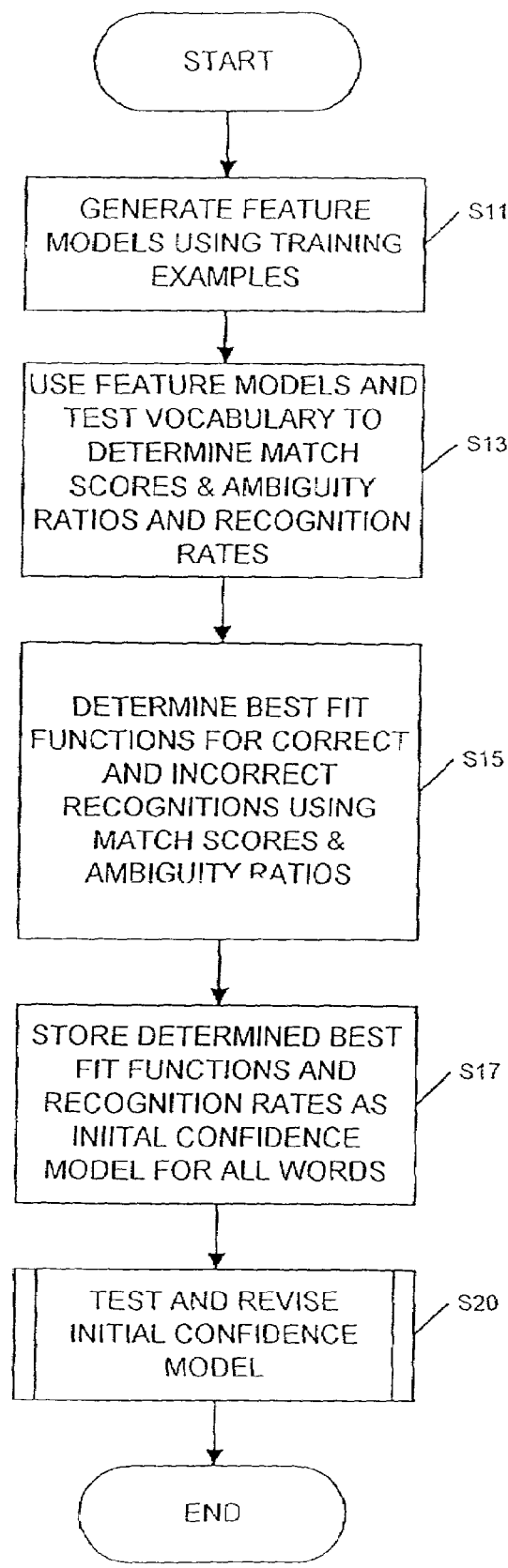
FIG. 8 is a flow diagram of the generation of a confidence model for a word.

FIG. 8 is a flow diagram of the generation of confidence model parameters and feature models for storage in the confidence model memory 110 and feature model memory 112 respectively.

Initially (S11) a set of training examples are used to generate feature models in a conventional manner. These features models are then stored in the feature model memory 110 of the word models block 19.

After a set of feature models have been stored within the feature model memory 110 a test vocabulary of known words is then (S13) processed by the speech recognition system to generate a set of parameter vectors $f_k$ for each utterance within the test vocabulary. This test vocabulary could comprise the training examples used to generate the feature models or could comprise another set of examples of utterances of known words. The generated parameter vectors $f_k$ are then passed to the comparison module 100 of the recognition block 19 which matches the parameter vectors to a feature model and outputs a matched word together with a best match score and ambiguity ratio score. However, at this stage since no confidence models are stored within the confidence model memory 112, instead of being utilized to generate a confidence score these best match scores and ambiguity ratios are output together with the output words matched to test utterances.

By comparing the output words the comparison model 100 matches to the known words that test utterances within the test vocabulary represent, the best match scores and ambiguity ratios are then divided into two groups namely those arising where a word is correctly matched and those arising where a word is incorrectly matched. Probability density histograms for the generation of certain best match scores and ambiguity scores arising when a word is correctly or incorrectly matched can then be determined.

Figure 9:
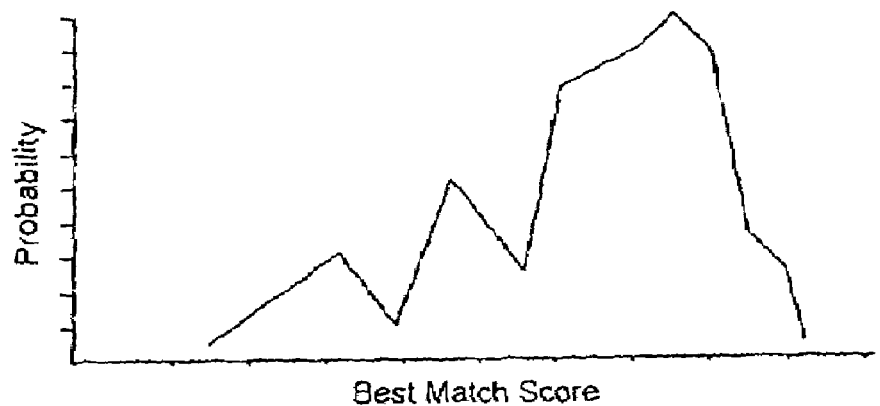
FIG. 9 is an exemplary plot of a histogram of best match score values for correct recognitions of words in a test vocabulary.
Figure 10:
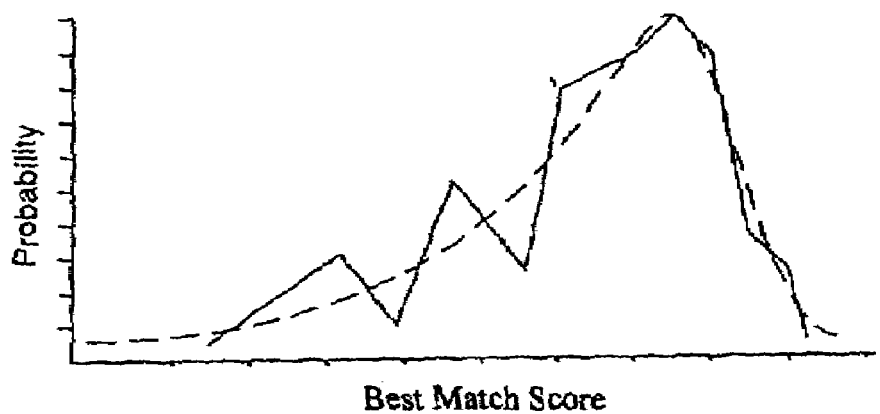
FIG. 10 is an exemplary plot of the matching of a function from a library of functions to the histogram of FIG. 9.
Figure 11:
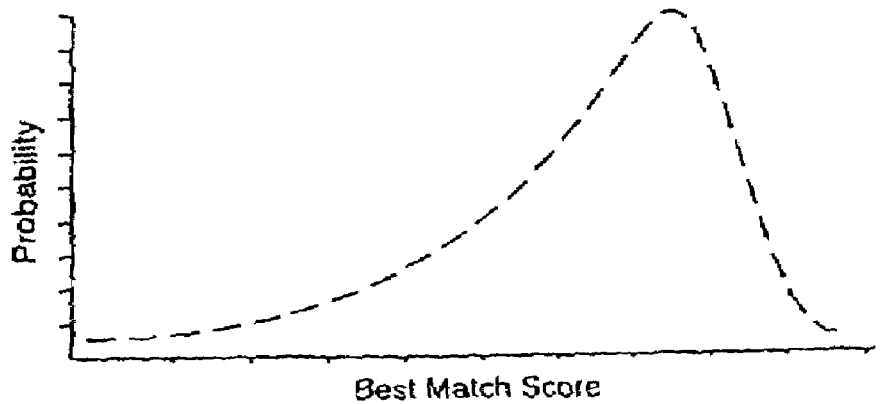
FIG. 11 is an exemplary illustration of a function resulting from the matching of the histogram of FIG. 9 to a function from a library of functions.

The processing of a generated probability density histogram is illustrated by FIGS. 9 to 11 in which, FIG. 9 is an exemplary schematic diagram of a probability density histogram for best match scores for correct matches for an exemplary test vocabulary. In accordance with the present invention standard computing techniques are then (s15) used to determine a function from a library of functions that most closely corresponds to the generated density probability histogram. FIG. 10 is an exemplary illustration of a function being matched with the exemplary probability density function of FIG. 9 and FIG. 11 is an illustration of an exemplary best fit function for the probability density histogram of FIG. 9.

When a function defined in terms of a function type and a set of parameters has been determined as the best fit for a generated probability density histogram of best match scores for correctly matched words, data indicative of the function is then stored. This matching of a probability density histogram to a function from a library of functions is then repeated for histograms generated from the best match scores of words incorrectly matched and the ambiguity ratio scores for correctly and incorrectly matched words.

After best fit functions for all four histograms have been determined corresponding probability parameters 134–140 are then stored as initial confidence models within the confidence model memory 112 for all of the feature models within the feature model memory 110 together with a value for an a priori recognition value 133 being equal to the proportion of correct recognitions of utterances from the test vocabulary.

Thus in this way by storing function parameters 132 for the probability that best match scores and ambiguity ratios equal to certain values for correct or incorrect recognitions arise, a means is provided by which an initial confidence model for each of the word models within the feature model memory 110 can be generated.

For most words within a vocabulary of a speech recognition system such an initial confidence model enables accurate confidence scores to be generated. However, for certain words, for example words having a significantly greater length than the majority of words within a vocabulary this may not be the case. Thus after an initial confidence model has been stored, the confidence models is therefore tested and revised (S20) to identify and amend confidence models for those words which require alternative confidence models as will now be described with reference to FIG. 12.

Figure 12:
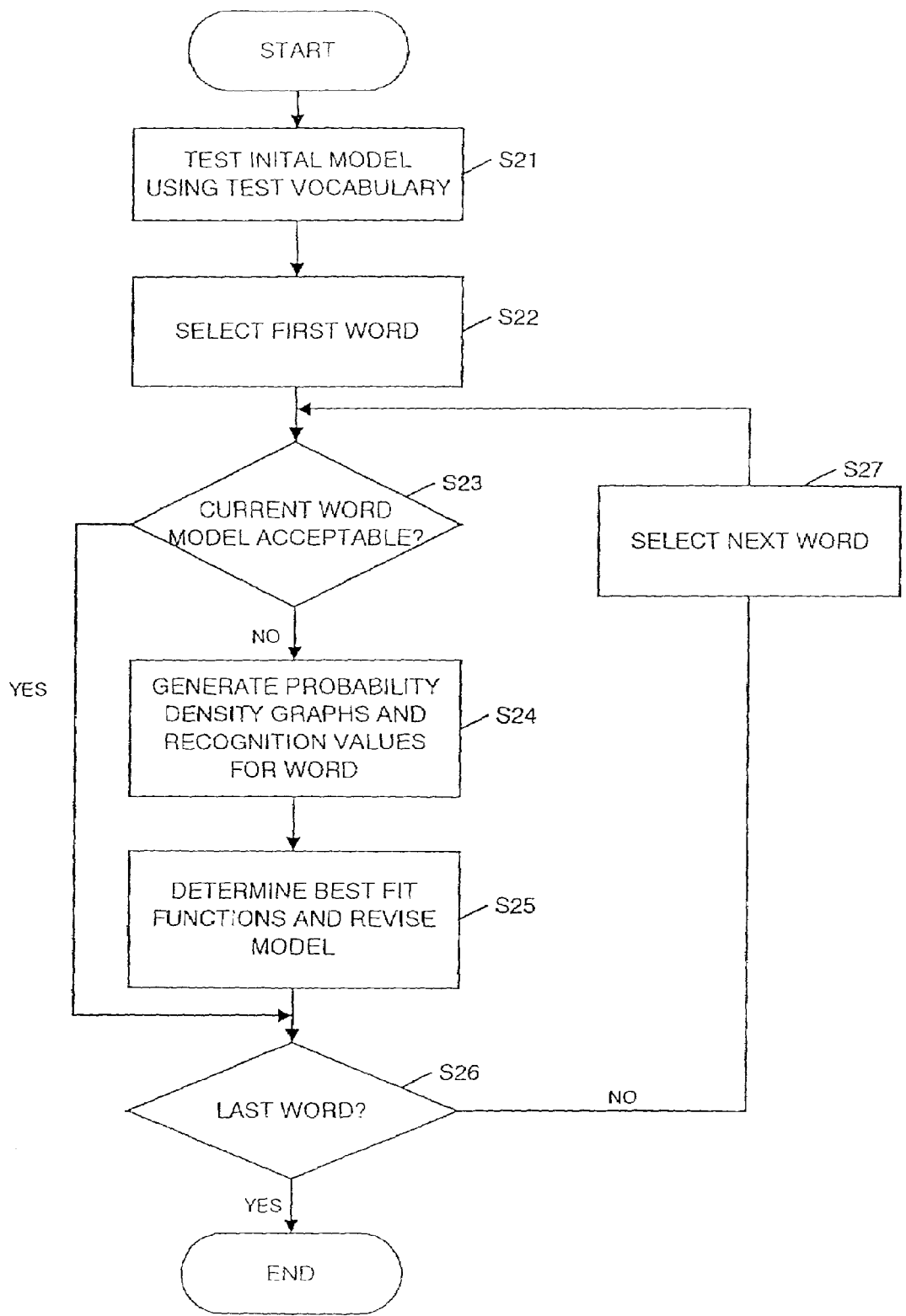
FIG. 12 is a flow diagram of the testing and revision of an initial confidence model.

FIG. 12 is a flow diagram of the processing for testing and revising an initial confidence model. Initially the test vocabulary of known words is once again passed through the speech recognition system. For each utterance within the test vocabulary the set of parameter vectors $f_k$ is generated which are then processed by the comparison module 110 to determine a matched word, a best match score and an ambiguity ratio. The best match score and ambiguity ratio are then passed to the conversion module 102 which this time determines a confidence score to be associated with the matched word utilising the initial confidence stored within the confidence model memory 112 associated with the matched word. The matched word and confidence score are then output. These values together with the actual words utterances represent then are utilized to determine whether the confidence models within the confidence model memory 112 are acceptable or require amendment for all of the words within the vocabulary as will now be explained in detail.

After all of the test vocabulary has been associated with a matched word, a confidence score and a word which the utterance represents, the first word for which a feature model is stored within the feature model memory, is selected (S22) and then (S23) the current confidence model for that word is determined as being acceptable or not. This can be determined since the average confidence score for utterances matched to a particular feature model should, if a stored confidence model for the feature model is accurate, be almost equal to the number of utterances correctly matched by the speech recognition system to the feature model divided by the total number of matches for that feature model. Whether or not a confidence model for a particular feature model is acceptably accurate can therefore be determined by calculating whether $$\frac{\sum conf(w_i) - correct(w)}{matched(w)} \le \varepsilon \quad (8)$$

where $\Sigma$ conf($w_i$) is the sum of the confidence score of all utterances matched to feature model w, correct(w) is the total number of utterances in the test vocabulary correctly matched to feature model w and matched(w) is the total number of utterances in the test vocabulary matched to feature model w and $\epsilon$ is an acceptable margin for error for example 0.05.

If the error rate from an initial confidence model for a feature model is not acceptable a probability density histogram for the best match scores and ambiguity ratios of correctly and incorrectly matched utterances to the feature model and recognition and misrecognition rates for the word can then be calculated (S24) and then a new set of parameters defining probability functions for the probabilities that best score value and ambiguity value ratio are generated (S25) can be determined in the same way as has previously been described in relation to the generation of an initial confidence model for all words in the vocabulary. These newly determined parameters 132 and determined a priori recognition rate 133 are then stored together with a word number 130 corresponding to the word number 120 for the feature model as a new confidence model for that particular feature model.

Since only a limited number of test utterances for each word are normally available, by initially basing a confidence model on all available utterances a means is provided to maximise the accuracy of most confidence models since in general the probability density histograms for different words closely resemble one another. However, by determining those words for which initially generated confidence models are not particularly accurate a means is provided to ensure that the improvement in accuracy for models for most words does not result in poor results for words which require models which differ significantly from the majority of the other confidence models for words in a vocabulary.

After either an initial confidence model for a word has been determined to be acceptable (S23) or after an unacceptable initial confidence model has been amended (S25) a determination is made (S26) whether the current confidence model under consideration is the last confidence model stored within the confidence model memory 112. If this is not the case the next confidence model is selected (S27) and a determination of whether the next confidence model is acceptable is then made and the model amended (S24–S25) if necessary.

When the last confidence model has been tested the confidence model memory 112 will have stored therein sets of parameters 132 and a priori recognition rates 133 which provide definitions of probability functions and an a priori recognition probabilities which result in relatively accurate calculations of confidence scores indicative of the posterior probability that a recognition is correct for all utterances within the test vocabulary.

Alternative Embodiments

A number of modifications can be made to the above speech recognition system without departing from the inventive concept of the present invention. A number of these modifications will now be described.

Although in the above embodiment a single default confidence model is initially stored as the confidence model for all words in a vocabulary and then alternative confidence models are stored for words in the vocabulary for which the default model is inaccurate, it will be appreciated that alternative methods for generating confidence models could be used. For example where a large amount of test data is available, individual confidence models could be generated from probability histograms for each of the words within a vocabulary.

Alternatively, a number of different confidence models could be generated for words within a vocabulary having significantly different lengths. This would be particularly advantageous since certain measured parameters generated when matching an utterance to a word model such as the best match score are dependant upon the length of an utterance. Therefore, by having different models for words of different lengths the accuracy of the confidence models can be increased.

Although in the above embodiment a confidence model for each feature model, comprises parameters defining a number of probability functions 132 and an a priori recognition values 133, other means for storing confidence models could be used. In particular, instead of storing a confidence model associated with every word model in the word model memory 110, only a limited number of words could be associated with confidence models stored in a memory and the word models which were not associated with confidence models could be arranged to cause the conversion module 102 to utilise a default confidence model. Thus in this way repeated storage of the same parameters for a number of different words could be avoided.

In the above described embodiment, a speech recognition system has been described in which each word has associated with it a single word model for matching against detected utterances. Where more than one word model is stored for the same word it is possible that the two best candidates for a detected utterance will be two different models for the same word. In such circumstance it is possible that the parameter vectors generated for an utterance will closely match both of the two best candidates for the same word which although being indicative of the ambiguity as to which of the models the utterance most closely matches is not indicative of uncertainty as to which word the utterance is meant to represent. The confidence score generated from the ratio of the match scores as described in the above embodiment may not therefore be indicative of an actual evaluation that an utterance has been correctly matched to a word.

One way to overcome this problem is for data to be stored indicating which of the feature models in the feature model memory are representative of the same word. If the two best matches for an utterance are representative of the same word then default value of a confidence score indicating high confidence in the recognition result could then be output. Alternatively a confidence score could be calculated utilising an ambiguity ratio for the ratio of the best match score for a word and the next best match score for a word for a feature model which is not representative of the same word as the best match. This ambiguity score could then be used by the conversion module 102 to generate a confidence score for the utterance.

It will be appreciated that calculated ambiguity ratios for the closeness of match could be determined as the best match score divided by the second best match score or alternatively, the second best match score divided by the best match score. If such an ambiguity ratio is used to determine a posterior probability of a match being correct given an utterance, the selection of how a ratio is arrived at is irrelevant provided a consistent method of calculation is used for the generation and application of confidence models.

In the above described embodiment a language model is described which restricts the number of possible words which can be matched to an utterance on the basis of the previously detected utterances. It will be appreciated that instead of a language model restricting the possible matches for utterances, a language model could be provided which utilised output confidence scores together with a model of the probability of words following each other within a word sequence to determined a confidence score for words within a detected word sequence.

More generally it will be appreciated that since the confidence score in accordance with the present invention is a value indicative of the posterior probability of the recognition of a word being correct given that a particular utterance resulted in the generation of particular values by the recognition block 17, a generated confidence score can be combined with any other value indicative of a word or sequence of words being correct based upon other available information to generate an improved confidence score which accounts for the other available information in addition to the data utilised by the recognition block 17.

Although in the above embodiment a speech recognition system has been described in which a confidence score is generated from determined values for a best match score and an ambiguity ratio, it will be appreciated that different calculated values indicating the goodness of a match could be used to determine a confidence score.

It also will be appreciated that a speech recognition system could be provided arranged to determine a confidence score indicative of the posterior probability of a word recognition being correct on the basis of a single value representative of how well a word model matches a detected utterance. In such a system parameters defining probability function for the manner in which the single determined value for a match varied for correct or incorrect recognitions of a word would need to be stored.

Alternatively three or more values could be determined indicating how well a features of a detected utterance matched stored word models and all of the determined values could be utilised by the conversion module 102 of the system to calculate a confidence score.

Although, in the above embodiment, a system is described which generates a confidence score in the same way for all matched words, different score generation methods could be used for different word matches. In particular, where the processing of an utterance results in the determination of a single match and no scores for other words are determined, for example, as might occur as a result of pruning, a default confidence score could be output. Alternatively, in such a circumstance a confidence determined only on the closeness of match between the utterance and the matched word might be used.

Although a continuous word speech recognition system is described in the first embodiment described above, it will be apparent to those skilled in the art that the system described above could equally apply to other kinds of speech recognition systems.

The speech recognition system described in the first embodiment can be used in conjunction with many different software applications, for example, a spreadsheet package, a graphics package, a word processor package etc. If the speech recognition system is to be used with a plurality of such software applications, then it might be advantageous to have separate word and language models for each application, especially if the phrases used in each application are different. The reason for this is that as the number of word models increases and as the language model increases in size, the time taken for the system to recognise an input utterance increases and the recognition rate decreases. Therefore, by having separate word and language models for each application, the speed of the speech recognition system and the recognition rate can be maintained. Additionally, several word and language models could be used for each application.

Additionally, as those skilled in the art will appreciate, the above speech recognition system can also be used in many different types of hardware. For example, apart from the obvious use in a personal computer or the like, the speech recognition system could be used as a user interface to a facsimile machine, telephone, printer, photocopier or any machine having a human/machine interface.

The present invention is not intended to be limited by the exemplary embodiments described above, and various other modifications and embodiments will be apparent to those skilled in the art.

The invention claimed is:

1. A speech processing apparatus comprising:
a data store operable to store a plurality of word models;
a receiver operable to receive an utterance; and
a matching unit operable to determine which of a plurality of word models stored in said data store most closely matches an utterance received by said receiver, said matching unit being arranged to output a value indicative of the goodness of each match between a most closely matching word model and an utterance received by said receiver;

characterized by further comprising:

a confidence model store operable to associate each word model stored in said data store with data indicative of the probability of a said value indicative of the goodness of match being output if said word model correctly or incorrectly matches an utterance; and a confidence score output unit operable to determine and output a confidence score indicative of a calculated posterior probability that a received utterance has been correctly matched to a word model given that the match resulted in the output of a particular value indicative of goodness of match, said output unit being arranged to calculate said confidence score for a match utilizing said value output by said matching unit and said data associated with the word model matched to utterances by said confidence model store.

2. Apparatus in accordance with claim 1, wherein said matching unit is arranged to output a plurality of values indicative of the goodness of a match, wherein said confidence model store is arranged to associate data indicative of the probability of each of said output values being output, and wherein said output unit is arranged to calculate said confidence scores for matches utilizing said plurality of output values and said data associated with word models by said confidence model store.

3. Apparatus in accordance with claim 1, wherein said confidence model store is arranged to associate the same data with all word models stored within said data store.

4. An apparatus in accordance with claim 1, wherein said confidence model store is further arranged to associate with word models data indicative of the probability of word models being correctly or incorrectly matched to any utterance, wherein said output unit is arranged to utilize said data to calculate said confidence score.

5. Apparatus in accordance with claim 1, wherein said confidence model store is arranged to associate different data with different word models stored within said data store.

6. Apparatus in accordance with claim 5, wherein said confidence model store is arranged to associate groups of word models stored in said data store with different data.

7. Apparatus in accordance with claim 1, wherein said matching unit is arranged to determine match scores indicative of the correspondence between an utterance and word models, and output as a value indicative of the goodness of a match of the match score for the most closely matching word model.

8. Apparatus in accordance with claim 7, wherein said matching unit is arranged to output as a value indicative of the goodness of a match, data indicative of the ratio of a match score indicative of the correspondence between an utterance and a most closely matching word model and a match score for the correspondence between an utterance and a different word model.

9. Apparatus in accordance with claim 8, wherein said different word model comprises the second most closely matching word model to an utterance.

10. Apparatus in accordance with claim 8, wherein said different word model comprises the most closely matching word model to an utterance that is representative of a different word to said most closely matching word model.

11. Apparatus in accordance with claim 1, wherein said confidence model store is arranged to associate with each word model data defining a probability density function of the probabilities of a said value being output if said word model correctly or incorrectly matches an utterance.

12. An apparatus in accordance with claim 11, wherein said data defining a probability density function comprises data defining a function type and one or more parameters.

13. An apparatus in accordance with claim 11, wherein said output unit is arranged to determine probabilities that a value indicative of goodness of match would be output if a word is correctly or incorrectly matched utilizing said data defining probability functions associated with a matched word and to utilize said determined probabilities to calculate said confidence score.

14. A method of generating data for association with word models stored within a speech processing apparatus in accordance with claim 1, the method comprising the steps of:

determining for each utterance in a test vocabulary of known words, word models matched to said test utterances and said values output by said matching unit;

for utterances correctly matched to known words in said test vocabulary, determining a function corresponding to the probability of said values indicative of goodness of match arising;

for utterances incorrectly matched to known words in said test vocabulary, determining a function corresponding to the probability of values indicative of goodness of match arising; and outputting data representative of said determined functions.

15. A method in accordance with claim 14, further comprising the steps of determining the proportion of utterances correctly or incorrectly matched to a word model and outputting data representative of the probability of a word model being correctly or incorrectly matched.

16. A method in accordance with claim 14, wherein said determination steps are performed for each word model stored in said speech processing apparatus and data is output for association with each of said models.

17. A method in accordance with claim 14, wherein said determination steps are performed for each word model stored in said speech processing apparatus representative of words of selected lengths and data is output for association with groups of models representative of words of said selected lengths.

18. A method in accordance with claim 14, further comprising the step of:

storing said output data in association with word models stored within a speech processing apparatus.

19. A method in accordance with claim 18, further comprising the steps of:

for a set of test utterances representative of known words, utilizing said speech processing apparatus to determine for said set of test utterances, a set of matched word models and output confidence scores;

for word models matched to test utterances, determining the difference between the sum of confidence scores for utterances matched to each said word model and the number of utterances correctly matched to said word model; and generating further data for association with a word model if said difference is greater than a predetermined proportion of said test utterances matched to said word model.

20. A recording medium storing computer implementable processor steps for generating within a programmable computer an apparatus in accordance with any of claims 1 to 4.

21. A recording medium in accordance with claim 20, comprising a computer disc.

22. A computer disc in accordance with claim 21, wherein said computer disc comprises an optical, a magneto-optical or magnetic disc.

23. A recording medium in accordance with claim 21, comprising electric signals transferred via the Internet.

24. A method of speech processing utilizing a speech processing apparatus, the method comprising:
storing a plurality of word models in a speech processing apparatus;
storing confidence model data in the speech processing apparatus associating each word model stored in the speech processing apparatus with data indicative of the probability of a value indicative of the goodness of a match being calculated if said word model correctly or incorrectly matches an utterance;
receiving an utterance;
calculating a value indicative of the goodness of the match between a most closely matching word model of said plurality of word models stored in the speech processing apparatus and the received utterance; and
determining and outputting a confidence score indicative of a calculated posterior probability that a received utterance has been correctly matched to a word model given that the match resulted in the calculation of said value indicative of goodness of match utilizing said value and the stored confidence model data associated with said word model,
wherein said calculated value indicative of the goodness of a match comprises data indicative of the ratio of a match score indicative of the correspondence between an utterance and a most closely matching word model and a match score for the correspondence between an utterance and a different word model.

25. A method in accordance with claim 24, wherein a plurality of values indicative of the goodness of a match are calculated, said storing confidence model data comprising storing data associating each word model with data indicative of the probability of each of said values being calculated if said word model correctly or incorrectly matches an utterance and wherein said confidence score is calculated utilizing said plurality of calculated values and said data associated with said word models.

26. A method in accordance with claim 24, wherein said calculated value indicative of the goodness of the match comprises a determined match score indicative of the correspondence between a received utterance and a stored word model.

27. A method in accordance with claim 24, wherein said different word model comprises the second most closely matching word model to an utterance.

28. A method in accordance with claim 24, wherein said different word model comprises the most closely matching word model to an utterance that is representative of a different word to said most closely matching word model.

29. A method in accordance with claim 24, wherein said storing confidence model data comprises storing data indicative of probability density functions of a value being output if an associated word model correctly or incorrectly matches an utterance.

30. A recording medium storing computer implementable processor steps for causing a programmable computer to perform a method in accordance with any of claims 24–26 and 27–29.

31. A recording medium in accordance with claim 30, comprising a computer disc.

32. A computer disc in accordance with claim 31, wherein said computer disc comprises an optical, a magneto-optical or magnetic disc.

33. A recording medium in accordance with claim 31, comprising electric signals transferred via the Internet.

34. A speech processing apparatus comprising:
storage means for storing a plurality of word models;
receiving means for receiving an utterance; and
matching means for determining which of a plurality of word models stored in said storage means most closely matches an utterance received by said receiving means, said matching means being arranged to output a value indicative of the goodness of each match between a most closely matching word model and an utterance received by said receiving means;
characterized by further comprising:
association means associating each word model stored in said storage means with data indicative of the probability of a said value indicative of the goodness of match being output if said word model correctly or incorrectly matches an utterance; and
determining means for determining and outputting a confidence score indicative of a calculated posterior probability that a received utterance has been correctly matched to a word model given that the match resulted in the output of a particular value indicative of goodness of match, said determining means being arranged to calculate said confidence score for a match utilizing said value output by said matching means and said data associated with the word model matched to utterances by said association means.

* * * * *

UNITED STATES PATENT AND TRADEMARK OFFICE
CERTIFICATE OF CORRECTION

PATENT NO. : 7,072,836 B2 Page 1 of 1
APPLICATION NO. : 09/898776
DATED : July 4, 2006
INVENTOR(S) : Yuan Shao It is certified that error appears in the above-identified patent and that said Letters Patent is hereby corrected as shown below:

COLUMN 4
Line 31, "4 KHz." should read --4 kHz.--.
Line 55, "process" should read --processes--.

COLUMN 8
Line 33, "is" should be deleted.

COLUMN 12
Line 22, "an" should be deleted.
Line 52, "model," should read --model--.
Line 53, "an" should be deleted.

COLUMN 18
Line 12, "claims 24-26" should read --claims 24-29.--.
Line 13, "and 27-29." should be deleted.

Signed and Sealed this

Twenty-fourth Day of April, 2007

JON W. DUDAS
*Director of the United States Patent and Trademark Office*